(12) United States Patent
Schaefer (10) Patent No.: US 8,434,972 B2
(45) Date of Patent: May 7, 2013

(54) BROACHING TOOL, IN PARTICULAR KEYWAY BROACHING TOOL

(75) Inventor: Hans Schaefer, Groebnestrasse (DE)

(73) Assignee: Hartmetall-Werkzeugfabrik Paul Horn GmbH, Tübingen (DE)

( * ) Notice: Subject to any disclaimer, the term of this patent is extended or adjusted under 35 U.S.C. 154(b) by 818 days.

(21) Appl. No.: 12/526,928

(22) PCT Filed: Feb. 13, 2008

(86) PCT No.: PCT/EP2008/001076
§ 371 (c)(1),
(2), (4) Date: Dec. 9, 2009

(87) PCT Pub. No.: WO2008/098744
PCT Pub. Date: Aug. 21, 2008

(65) Prior Publication Data
US 2010/0104390 A1    Apr. 29, 2010

(30) Foreign Application Priority Data
Feb. 17, 2007  (DE) .......................... 10 2007 008 081

(51) Int. Cl.
*B23D 43/00* (2006.01)
*B23D 43/06* (2006.01)
(52) U.S. Cl.
USPC .............................................. 407/15; 407/13
(58) Field of Classification Search ............. 407/15, 407/13, 17, 18
See application file for complete search history.

(56) References Cited

U.S. PATENT DOCUMENTS

| 1,436,826 | A | * | 11/1922 | Schmidt | 407/8 |
| 2,093,513 | A | * | 9/1937 | Campbell | 29/890.15 |
| 2,430,733 | A | * | 11/1947 | Paxson | 7/158 |
| 3,540,101 | A | * | 11/1970 | Rosan, Sr et al. | 407/13 |
| 3,621,548 | A | * | 11/1971 | Kinley et al. | 407/13 |
| 3,707,748 | A | * | 1/1973 | Price et al. | 407/17 |

(Continued)

FOREIGN PATENT DOCUMENTS

| DE | 009014657 | 1/1991 |
| DE | 3934703 A1 | 4/1991 |

(Continued)

OTHER PUBLICATIONS

International Search Report for PCT Application No. PCT/EP2008/001076 completed May 14, 2008 and mailed May 21, 2008, 4 pages.

*Primary Examiner* — Will Fridie, Jr.
(74) *Attorney, Agent, or Firm* — Turocy & Watson, LLP (57) ABSTRACT

The invention relates to a broaching tool, in particular a keyway broaching tool, comprising a holder which defines a longitudinal axis and has a shank, extending in the longitudinal direction, as support for a cutting body which can be fixed in a seat of the shank by means of a clamping device. The seat has a passage which is at a distance from the free end of the shank and extends transversely to the longitudinal axis and the inside of which forms guide surfaces for bearing surfaces of the cutting body, which can be inserted into the passage in an insertion direction. An end-position limit for the inserted cutting body is formed on guide surfaces and on associated bearing surfaces. The clamping device produces a force component on the cutting body which presses the latter against the end-position limit.

17 Claims, 7 Drawing Sheets

U.S. PATENT DOCUMENTS

| | | | |
|---|---|---|---|
| 4,274,766 A * | 6/1981 | Raupp et al. | 407/15 |
| 5,215,414 A * | 6/1993 | Roseliep | 407/14 |
| 2009/0297281 A1 * | 12/2009 | Gardner | 407/17 |

FOREIGN PATENT DOCUMENTS

| | | | |
|---|---|---|---|
| DE | 009203373 U1 | | 4/1992 |
| DE | 029808688 | | 9/1998 |
| DE | 102007008081 A1 | | 8/2008 |
| EP | 2 125 278 | | 12/2009 |
| GB | 672039 | | 5/1952 |
| GB | 2005170 A | * | 4/1979 |
| WO | 2008/098744 A1 | | 8/2008 |

* cited by examiner

BROACHING TOOL, IN PARTICULAR KEYWAY BROACHING TOOL

CROSS-REFERENCE TO RELATED APPLICATIONS

This is a Continuation application of International patent application PCT/IB 2008/001076, filed Feb. 13, 2008, which claims the priority of German patent application DE 10 2007 008 081 filed Feb. 17, 2007.

BACKGROUND OF THE INVENTION

1. Brief Summary of the Invention

The invention relates to a broaching tool, in particular a keyway broaching tool, comprising a holder which defines a longitudinal axis and has a shank, extending in the longitudinal direction, as support for a cutting body which can be fixed in a seat of the shank by means of a clamping device.

2. Related Prior Art

If such broaching tools are used for machining operations in which the highest accuracy and high surface quality are required, two main requirements have to be met. Firstly, it must be ensured through high strength of the shank that forces and moments, in particular bending moments, which are introduced into the seat via the cutting body are absorbed by the shank in an absolutely reliable manner without changes in the geometry occurring.

Secondly, the positional fixing of the cutting body itself in the seat of the shank must be designed to be absolutely secure.

Both of these requirements cannot be easily met, in particular if the broaching tool, in particular during use as a keyway broaching tool, is intended for internal machining in a bore of a workpiece or in a hollow body. In order to achieve an adequate working depth in these cases, for example in order to achieve inner longitudinal keyways in a bore with sufficient keyway length, it is necessary for the shank to have a corresponding length. If the machining is to be carried out in bores having a relatively small diameter, this inevitably results in a slim, elongated design for the shank, a factor which is detrimental to the structural strength. In addition to this problem there is also the fact that the design of the seat for the cutting body results in a local reduction in the load-bearing material cross section of the shank, a factor which likewise impairs the structural strength.

SUMMARY OF THE INVENTION

In view of these problems, the object of the invention is to provide a broaching tool, in particular a keyway broaching tool, in which an especially torsion-proof and deflectionresistant working position of the cutting body even in a comparatively slim design of the shank is ensured. Further, it is an object to provide a corresponding cutting body.

According to the invention, this object is achieved in a first aspect by a broaching tool comprising a cutting body, a holder which defines a longitudinal axis and has a shank, extending in the longitudinal direction, as support for the cutting body, a clamping device for fixing the cutting body in a seat of the shank; wherein the seat has a passage which is at a distance from the free end of the shank and extends transversely to the longitudinal axis and the inside of which forms guide surfaces, for bearing surfaces of the cutting body, which can be inserted into the passage in an insertion direction, wherein an end-position limit for the inserted cutting body is formed on guide surfaces and on associated bearing surfaces, and wherein the clamping device produces a force component on the cutting body which presses the latter against the end-position limit.

Owing to the fact that, according to the invention, the seat of the cutting tool is formed by a passage in the shank, said passage forming a guide for the cutting body to be inserted into the passage, wherein guide surfaces of the passage bear against bearing surfaces of the cutting body, the cutting body is accommodated in the passage in a matching, enclosed manner and thereby forms a reinforcing body which compensates, as it were, for the reduction, caused by the forming of the passage, in the material cross section of the shank. Owing to the fact that, according to the invention, an end-position limit is also provided for the inserted cutting body and the clamping device is designed in such a way that it produces a force component on the cutting body which presses the latter against the end-position limit, optimum positional fixing of the cutting body is obtained by the bearing surfaces thereof bearing against the guide surfaces of the passage in which the cutting body is enclosed.

With regard to the design of the end-position limit, the arrangement can be made in such a way that at least one surface part projecting from a bearing surface is provided on the cutting body, said surface part forming a stop surface which, when the cutting body is inserted, comes to bear against a step, forming a counter-stop, of a guide surface of the passage.

In alternative exemplary embodiments, however, the arrangement can also be made in such a way that at least one surface part of the guide surface of the passage forms a sloping surface which is inclined relative to the insertion direction and against which a slope, forming part of the bearing surface, of the cutting body bears when the latter is inserted into the desired end position.

Irrespective of the design of the end-position limit, it is ensured that the positional setting and fixing of the cutting body is effected with the greatest accuracy owing to the fact that the clamping device, when clamping the cutting body in place, produces a force component on the cutting body which presses the latter against the end-position limit.

In advantageous exemplary embodiments, the cutting body has a parent member in the form of a plate which is to be accommodated in the passage of the shank and whose wide sides opposite one another form bearing surfaces for the guide surfaces of the passage. Due to such bearing against the inside of the passage over a large area, the parent member of the cutting body especially helps to reinforce the structure of the shank.

In such exemplary embodiments, the clamping device can advantageously have a clamping screw which passes through a hole in the parent member of the cutting body, said hole running perpendicularly to the wide sides, defining parallel planes, of said parent member, wherein, for the clamping screw, a tapped hole is provided on the shank in one of the guide surfaces of the passage. This configuration opens up the advantageous possibility of realizing on the cutting body, in a simple manner in terms of design, the desired force component for bearing against the end-position limit by the relative positional arrangements of the hole in the parent member of the cutting body, of the tapped hole in the passage of the shank and of the end-position limit for the cutting body being selected in such a way that the tightening of the clamping screw produces both a clamping force and the force component which acts in the insertion direction and presses the projecting surface part of the cutting body against the counter-stop of the passage in the desired manner or presses the slope of the cutting body against the sloping surface of the passage of the shank.

The cutting body preferably has at least one cutting edge on an extension, extending radially relative to the longitudinal axis, of the parent member.

In especially advantageous exemplary embodiments which permit especially efficient and economical production of longitudinal keyways in bores, two extensions opposed to one another are provided on the parent member in order to form two cutting edges which extend in a radially projecting manner, diametrically relative to one another, from the shank and work with a pushing action in working directions opposed to one another.

In this case, the arrangement can be made in such a way that the extensions are designed to be axially symmetrical to one another, preferably symmetrical to the axis of the hole which is provided in the parent member for the clamping screw.

The object is also achieved according to another aspect of the invention by a cutting body for use in a broaching tool according to the invention, wherein the cutting body comprises a plate-like parent member which has at least one extension forming a cutting edge, and comprising a hump projecting on a wide side of the plate-like parent member and having a step which forms a stop surface for a counter-stop in the seat of the tool holder.

According to still another aspect the invention relates to a cutting body for a broaching tool according to the present invention, comprising a plate-like parent member which has at least one extension forming a cutting edge and has a sloping surface on a narrow side, which sloping surface, for the end-position limit, can be brought to bear against a sloping surface formed in the seat of the tool holder.

BRIEF DESCRIPTION OF THE DRAWINGS

The invention is explained in detail below with reference to exemplary embodiments shown in the drawing, in which.

DETAILED DESCRIPTION OF PREFERRED EMBODIMENTS

Figure 1:
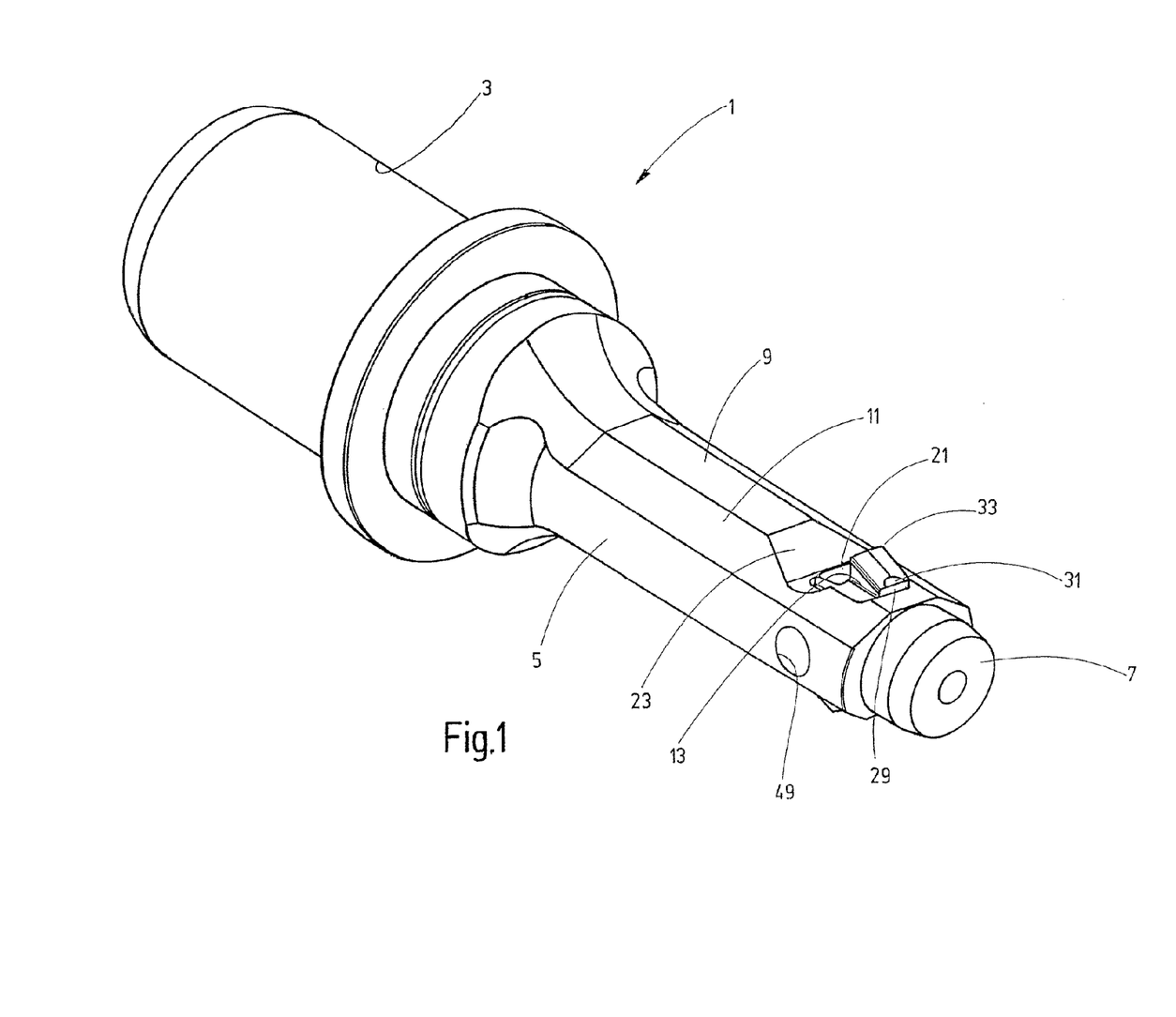
FIG. 1 shows a perspective oblique view of an exemplary embodiment of the broaching tool according to the invention, shown virtually twice full size compared with a practical embodiment.
Figure 3:
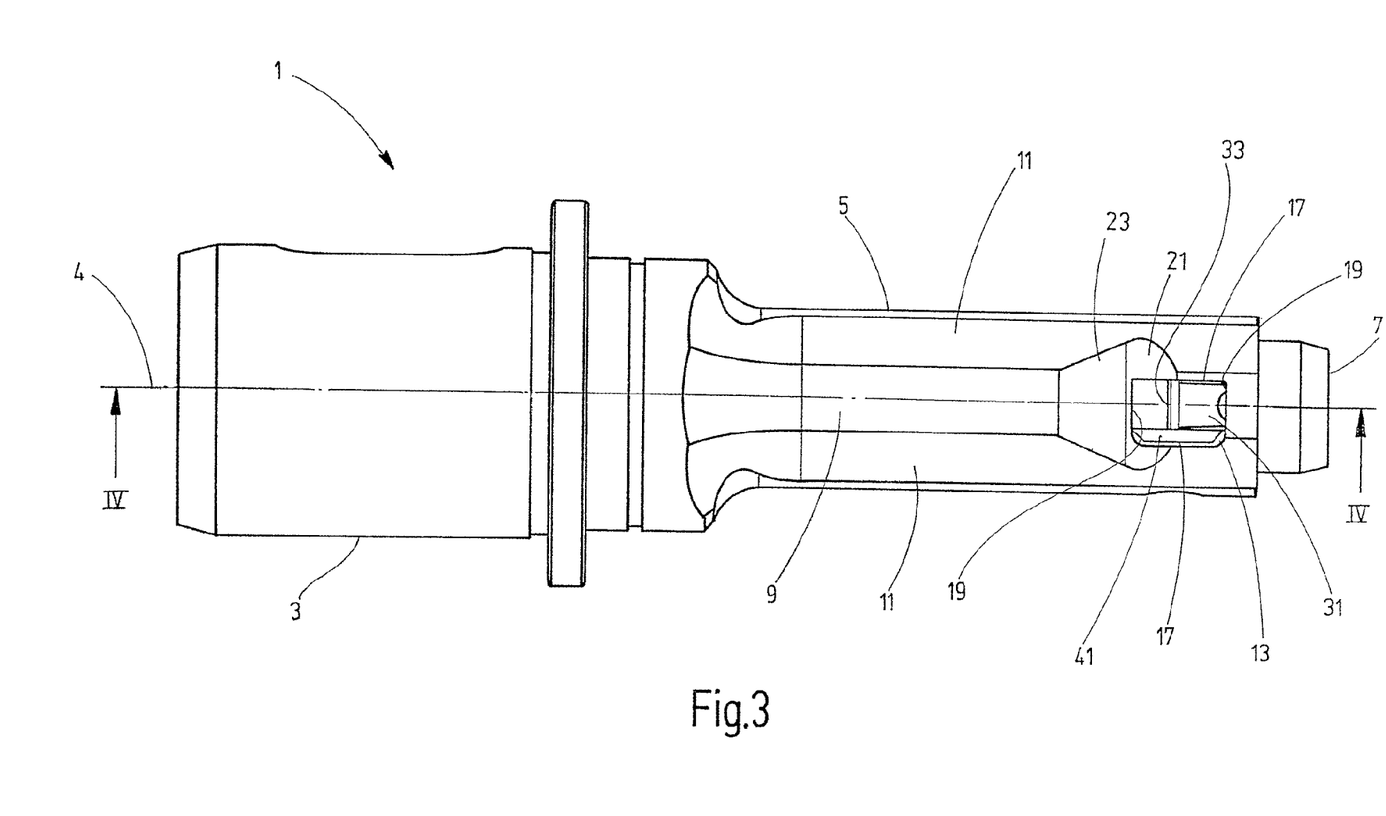
FIG. 3 shows a side view, depicted approximately at the scale of FIG. 1, of the exemplary embodiment.

The holder 1, designated by 1 overall in FIGS. 1 and 3, has a rear clamping part 3 with which the broaching tool can be clamped in place in a machine tool (not shown), by means of which the tool can be moved in the direction of the tool longitudinal axis 4 (FIGS. 3 and 6) for a reciprocating broaching operation in the forward direction and rearward direction. Adjoining the clamping part 3 is a shank 5, which is narrowed relative to the clamping part 3 and the front shank end of which is designated by 7. Whereas the clamping part 3 is by and large of circular-cylindrical shape, the outer surface of the shank 5 has contouring with flat surface regions 9 and 11, see in particular FIG. 1. At a small distance from the front end 7, the shank 5 has a passage 13, the inside of which forms guide surfaces for a cutting body which can be inserted in an insertion direction and is depicted overall by 15 in the figures. Further details of the cutting body 15 are illustrated in particular in FIGS. 8 to 11. The passage 13 has inner guide surfaces 17 in planes parallel to one another and to the longitudinal axis 4 and guide surfaces 19 in planes running transversely to the longitudinal axis 4. In interaction with bearing surfaces of the cutting body 15 to be pushed in, these guide surfaces 17 and 19 form a matching guide, into which the cutting body 15 can be pushed in an insertion direction, to be precise from an entry end of the passage 13, said end being shown in FIGS. 1, 3 and 4 and 5 as that end of the passage 13 which lies at the top, where the passage is widened via sloping surfaces 21 and 23. The cutting body 15 can be inserted from the insertion end right into an end position which is defined by an end-position limit and in which the guide surfaces 17 and 19 bear in a matching manner against the associated bearing surfaces of the cutting body 15.

Figures 2, 8, 9, 10:
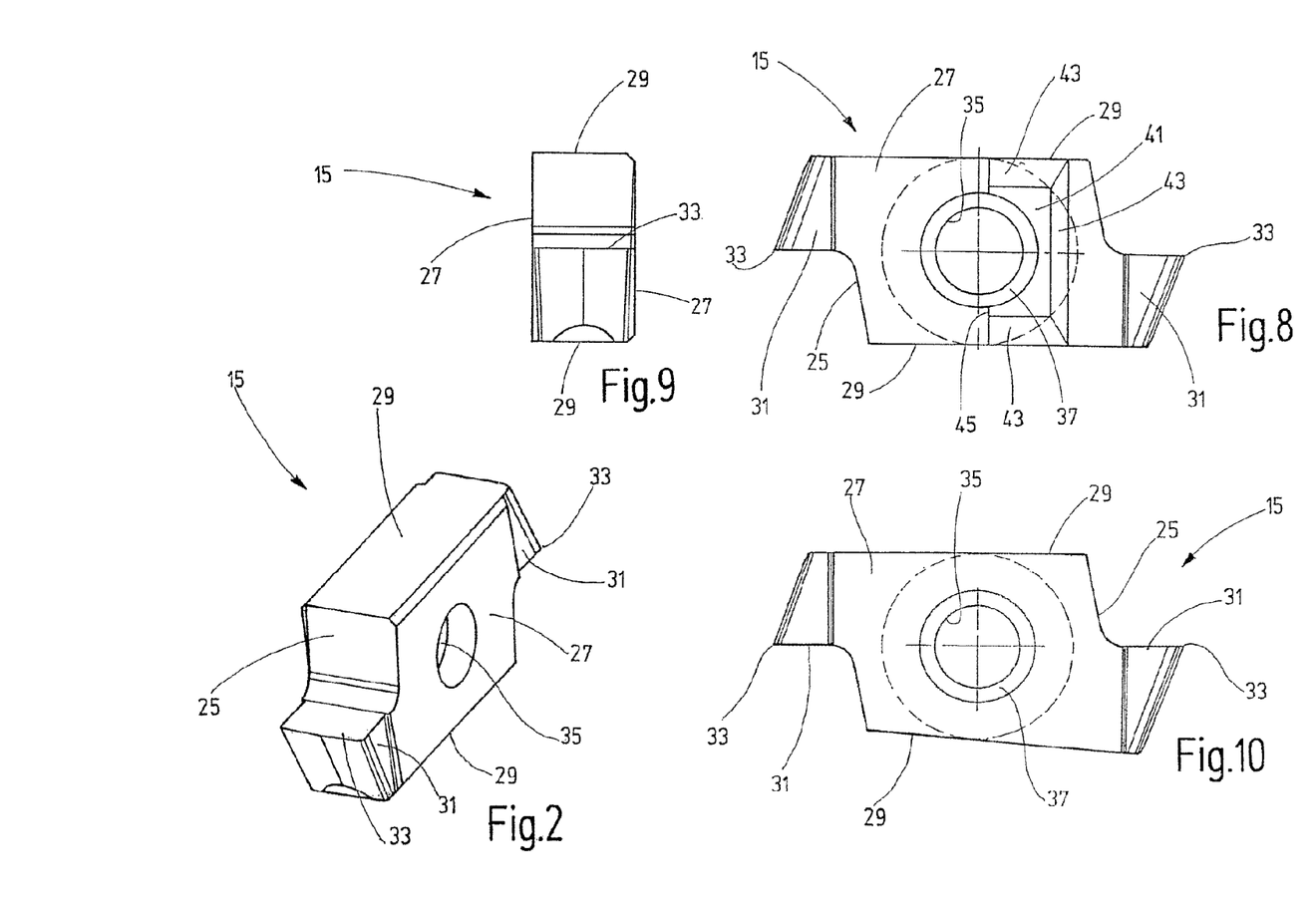
FIG. 2 shows a perspective oblique view, depicted at an even larger scale, of a cutting body for the exemplary embodiment in FIG. 1.
FIGS. 8 and 9 show a front view and a side view, respectively, of the cutting body, shown in perspective in FIG. 2, of the first exemplary embodiment, approximately 3.5 times enlarged compared with a practical embodiment.
FIG. 10 shows a front view, corresponding to FIG. 8, of the cutting body for the second exemplary embodiment of the broaching tool.
Figure 11:
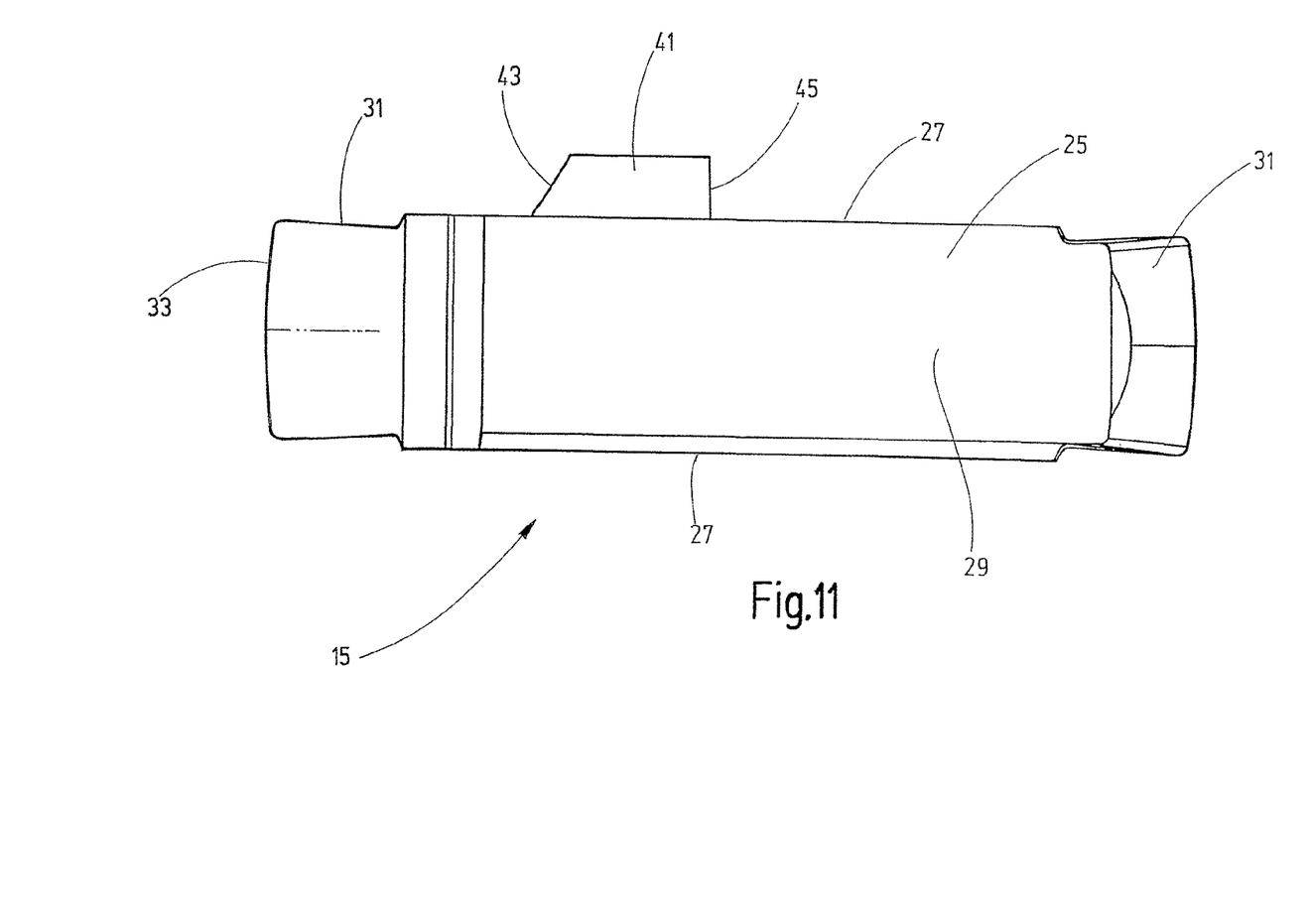
FIG. 11 shows a plan view, approximately 8 times enlarged compared with a practical embodiment, of the cutting body of the first exemplary embodiment.

As mentioned, FIGS. 8 to 11 show further details of the cutting body 15, where FIGS. 8, 9 and 11 show a cutting body 15 for a first exemplary embodiment and FIG. 10 shows a cutting body 15 for a second exemplary embodiment. In both exemplary embodiments, the cutting body 15 has a plate-like parent member 25, the wide sides 27 of which run in planes parallel to one another. These wide sides 27 form, with surface regions, the bearing surfaces for the guide surfaces 17 of the passage 13. The by and large rectangular parent member 25 forms, with its planar narrow sides 29 parallel to one another, the bearing surfaces for the guide surfaces 19 in the passage 13.

The cutting bodies 15 of both exemplary embodiments have extensions 31 on two diametrically opposite corner regions of the parent member 25, said extensions 31 being formed axially symmetrically to one another and forming a respective cutting edge 33. As can be seen most clearly from FIG. 8, the extensions 31 are symmetrical to the axis of a through-hole 35 which is located in the center of the wide sides 27 of the parent member 25 and has a tapered widening 37 at one hole end.

Figure 7:
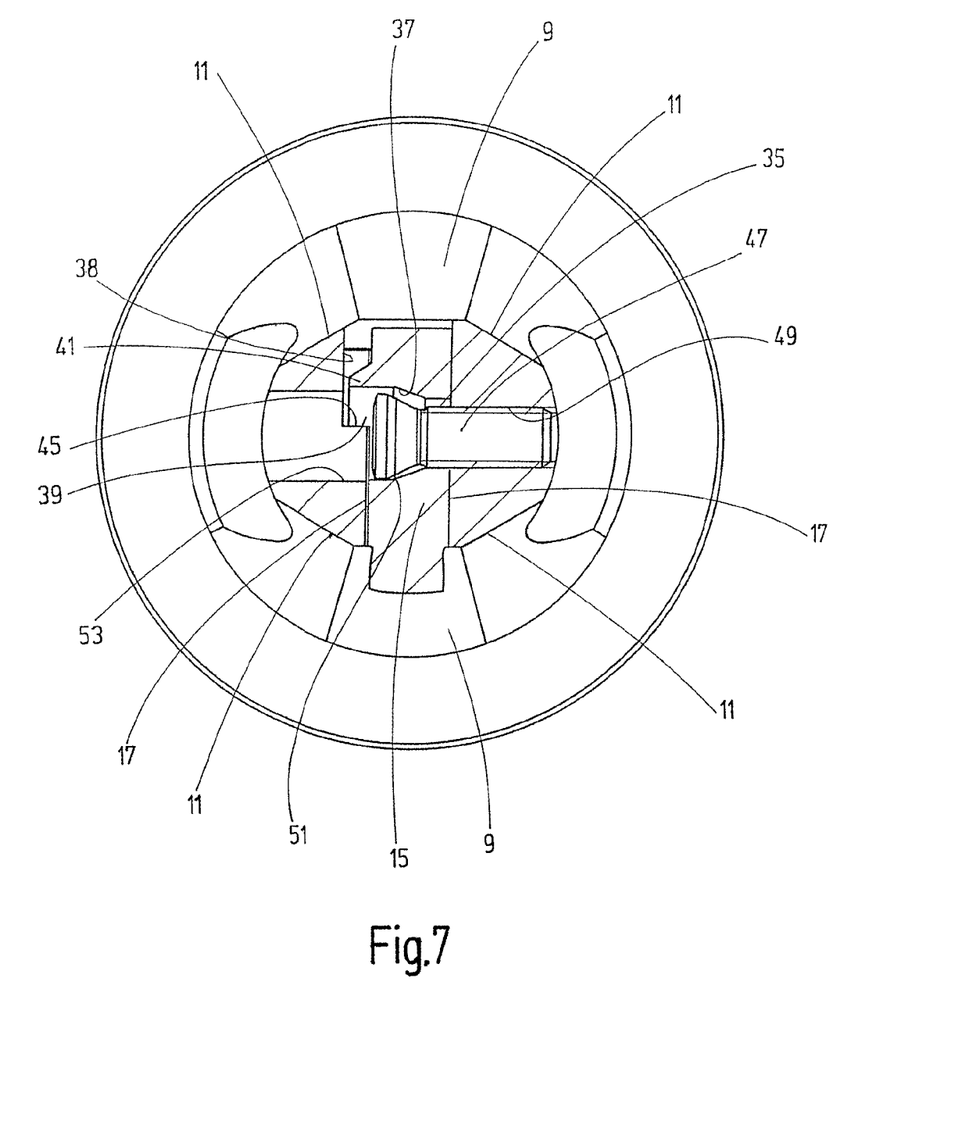
FIG. 7 shows a section along section line VII-VII approximately 1.5 times enlarged compared with FIG. 6, the workpiece not being shown.

As already mentioned, the cutting body 15 can be inserted from the insertion end of the passage 13 in an insertion direction into the guide, in which guide surfaces 17, 19 are guided on the bearing surfaces formed by the wide sides 27 and the narrow sides 29 of the cutting body, to be precise right up to an end-position limit. The first and the second exemplary embodiments to be described here differ merely with regard to the design of the end-position limit. As shown in FIG. 7, a widening 38 is provided for this purpose in the passage 13 in the first exemplary embodiment, a step 39 being formed on the guide surface 17 by this widening 38. This step 39 forms a counter-stop for a stop surface which is formed on the parent member 25 of the cutting body 15. The configuration on the parent member 25 in this respect can best be seen from FIGS. 4, 8 and in particular 11. As shown there, a hump 41 rises from the one wide side 27 of the parent member 25, and this hump 41 forms a plateau defined on three sides by bevels 43 and having a stop surface 45 which is perpendicular thereto and is located on the fourth side and which, when the cutting body 15 is in the end position in the passage 13, interacts with the step 39, forming the counter-stop, in the passage 13.

As already mentioned, the parent member 25 of the cutting body has a central hole 35 with a conical widening 37 at the end. A clamping screw 47 passes through this hole 35, as a component of the clamping device, and can be screwed into a tapped hole 49 opening out at the guide surface 17 of the passage 13. Like a countersunk head screw, the clamping screw 47 has a screw head 51 widening conically from the screw shank. As can best be seen from FIG. 7, in which the cutting body 15 is shown in its end position, the tapped hole 49 and the through-hole 35 in the parent member 25 of the cutting body 15 are eccentric to one another in such a way that, when the clamping screw 47 is tightened, the conical head 51 in interaction with the conical end widening 37 of the hole 35 produces a force component on the cutting body 15 which thrusts the latter downward in the direction of view according to FIG. 7. This means not only that the clamping screw 47 clamps the cutting body 15 in place, by the wide side 27 of the parent member 25 being pressed against the guide surface 17 of the passage 13, but that the stop surface 45 formed on the hump 41 of the cutting body 15 is pressed, for a defined end-position limit, against the step 39 in the passage 13.

Figures 4, 5:
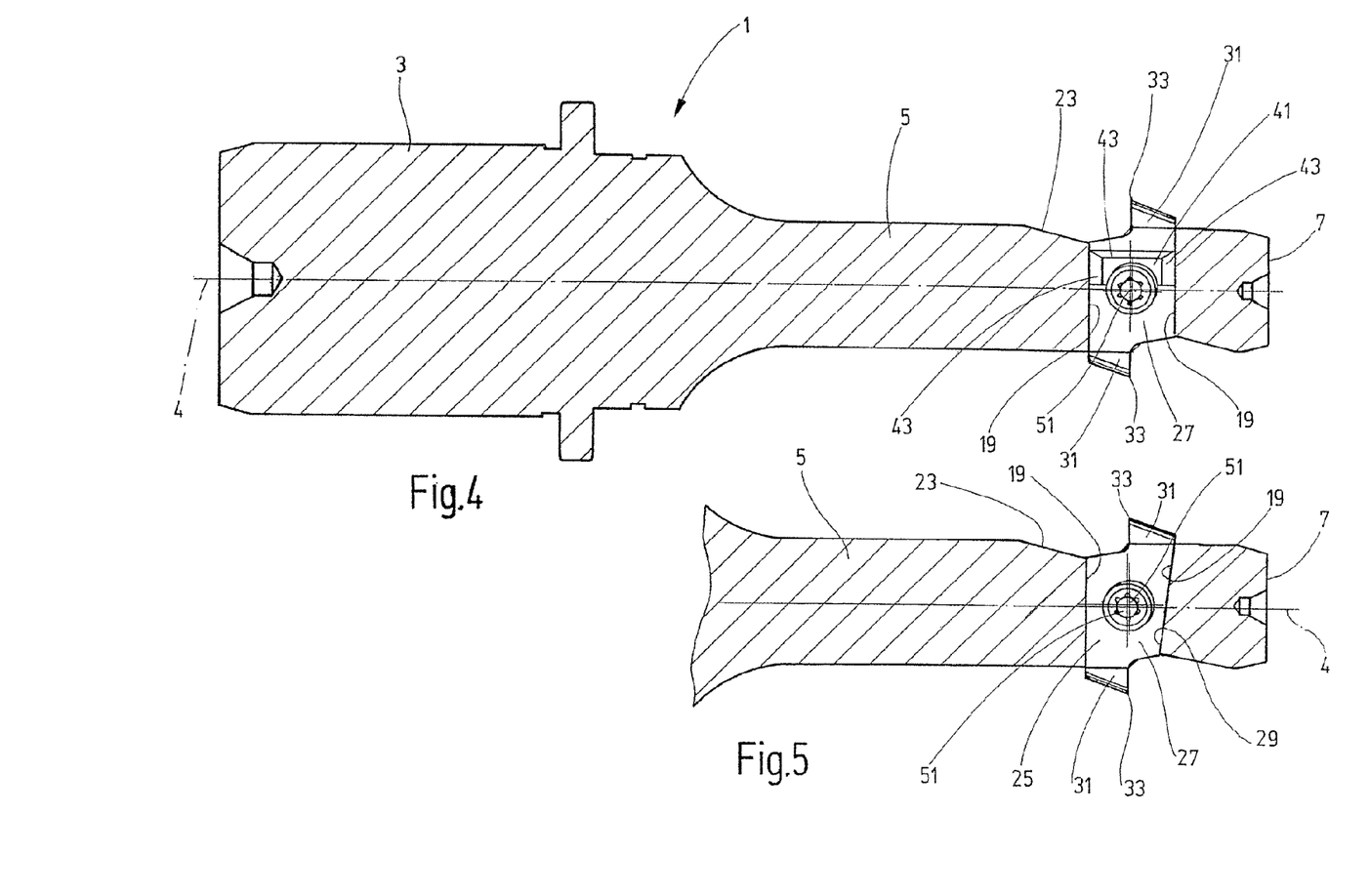
FIG. 4 shows a longitudinal section along section line IV-IV in FIG. 3.
FIG. 5 shows a longitudinal section, corresponding to FIG. 4, of a second exemplary embodiment of the broaching tool, only the front part of the shank being shown in a truncated illustration.

As shown by the comparison of FIGS. 8 and 10, the cutting body 15 of the second exemplary embodiment does not have a hump 41 on the parent member 25. Instead, in order to form the end-position limit, that narrow side 29 of the parent member 25 which lies at the bottom in FIG. 10 has an inclination relative to the other narrow side 29, this inclination being in the order of magnitude of about 11 angular degrees in the exemplary embodiment shown. In a corresponding manner, as shown in FIG. 5, the associated guide surface 19 of the passage 13 has a corresponding inclination. Whereas in the first exemplary embodiment the passage 13, at that guide surface 17 which is provided with the aperture 53 for the clamping screw 47, has a widening 38, forming the step 39, as counter-stop for the hump 41 of the cutting body, this guide surface 17 in the second exemplary embodiment is continuous except for the aperture 53. In the same way as in the first exemplary embodiment, however, the tapped hole 49 and the hole 35 in the parent member 25 of the cutting body 15 in the second exemplary embodiment are also eccentric in such a way that, when the clamping screw 47 is tightened, the conical surface on the head 51 in interaction with the conical end widening 37 of the hole 35 produces a force component on the cutting body 15 along the guide surfaces 17 in such a way that the sloping narrow side 29 of the parent member 25 and the sloping guide surface 19 of the passage 13 bear against one another in the end position, as a result of which a push-in movement is limited by the resulting constriction of the guide in the end position.

Figure 6:
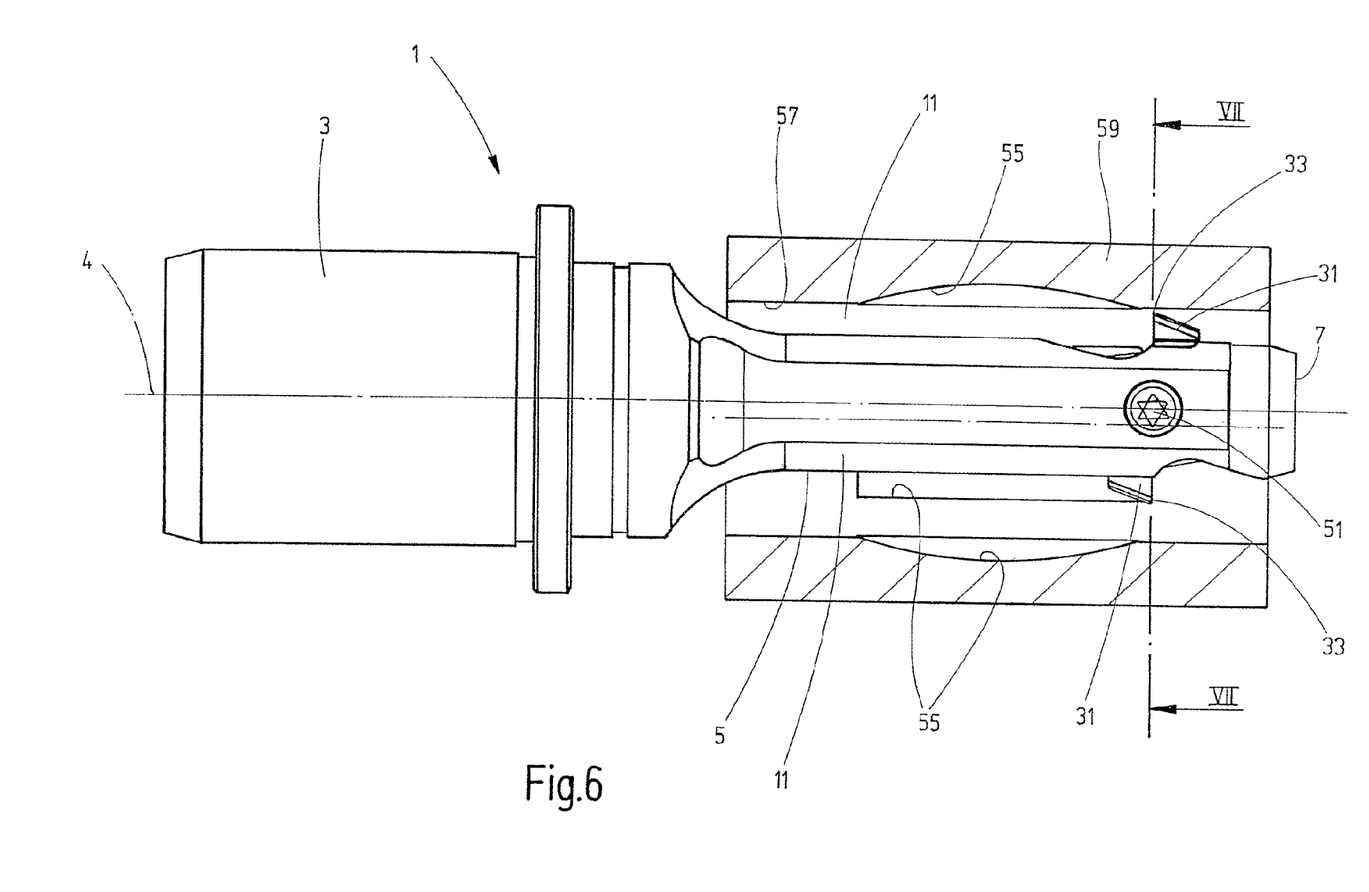
FIG. 6 shows a side view, similar to FIG. 3, of both the first and the second exemplary embodiments, but rotated by 90 degrees relative to FIG. 3 and the shank being located inside the bore, to be machined, of a schematically indicated workpiece.

Owing to the fact that, in both exemplary embodiments, extensions 31 which are symmetrical to one another and have cutting edges 33 are provided on the parent member 25 of the cutting body 15, the tool according to the invention is especially suitable for forming a plurality of longitudinal keyways 55 in the bore 57 of a workpiece 59 in a, as it were, "continuous" machining operation, said workpiece 59 merely being indicated schematically in FIG. 6. Due to the symmetrical arrangement of the extensions 31 having the cutting edges 3, the tool works with a pushing action in both directions of the reciprocating working movement, such that, during a working cycle in which a reciprocating relative movement is produced between holder 1 and workpiece 59, for example by the holder being driven longitudinally, two keyways 55 opposite one another can be machined. In the process, the radial infeed movement can be effected either by feed movements imparted to the workpiece 59 or by infeed of the holder 1. In order to produce keyways 55 distributed over the inner circumference of the relevant bore 57, the workpiece 59 can be rotated relative to the holder 1 or the latter can be rotated relative to the workpiece 59.

What is claimed is:

1. A broaching tool comprising:
   a cutting body;
   a holder which defines a longitudinal axis and has a shank, extending in the longitudinal direction, as support for the cutting body;
   a clamping device for fixing the cutting body in a seat of the shank;
   wherein the seat has a passage which is at a distance from the free end of the shank and extends transversely to the longitudinal axis and the inside of which forms guide surfaces for bearing surfaces of the cutting body, which can be inserted into the passage in an insertion direction,
   wherein an end-position limit for the inserted cutting body is formed on guide surfaces and on associated bearing surfaces, and
   wherein the clamping device produces a force component on the cutting body which presses the latter against the end-position limit, wherein to form the end-position limit, at least one surface part projecting from a bearing surface is provided on the cutting body, said surface part forming a stop surface which, when the cutting body is inserted, comes to bear against a step, forming a counter-stop, of a guide surface of the passage.

2. The broaching tool as claimed in claim 1, wherein to form the end-position limit, at least one surface part of the guide surface of the passage forms a sloping surface which is inclined relative to the insertion direction and against which a slope, forming part of the bearing surface, of the cutting body bears when the cutting body is inserted.

3. The broaching tool as claimed in claims 1, wherein the cutting body has a parent member in the form of a plate which is to be accommodated in the passage of the shank and whose wide sides opposite one another form bearing surfaces for the guide surfaces of the passage.

4. The broaching tool as claimed in claim 3, wherein the relative positional arrangements of the hole in the parent member of the cutting body, of the tapped hole in the passage of the shank and of the end-position limit for the cutting body are selected in such a way that, when the clamping screw is tightened, the force component for pressing the stop surface of the cutting body against the counter-stop of the passage or for pressing the slope of the cutting body against the sloping surface of the passage of the shank is produced on said cutting body.

5. The broaching tool as claimed in claim 3, wherein the cutting body has at least one cutting edge on an extension, extending radially relative to the longitudinal axis, of the parent member.

6. The broaching tool as claimed in claim 5, wherein two extensions opposed to one another are provided on the parent member in order to form two cutting edges which extend in a radially projecting manner, diametrically relative to one another, from the shank and work with a pushing action in working directions opposed to one another.

7. The broaching tool as claimed in claim 6, wherein the extensions are designed to be axially symmetrical to one another.

8. The broaching tool as claimed in claim 7, wherein the extensions are symmetrical to the axis of the hole in the parent member.

9. A cutting body for a broaching tool, said broaching tool comprising a holder which defines a longitudinal axis and has a shank, extending in the longitudinal direction, as support for the cutting body, a clamping device for fixing the cutting body in a seat of the shank, wherein the seat has a passage which is at a distance from the free end of the shank and extends transversely to the longitudinal axis and the inside of which forms guide surfaces for bearing surfaces of the cutting body, which can be inserted into the passage in an insertion direction, wherein an end-position limit for the inserted cutting body is formed on guide surfaces and on associated bearing surfaces, and wherein the clamping device produces a force component on the cutting body which presses the latter against the end-position limit, wherein the cutting body comprises a plate-like parent member which has at least one extension forming a cutting edge, and comprising a hump projecting on a wide side of the plate-like parent member and having a step which forms a stop surface for a counter-stop in the seat of the tool holder.

10. A cutting body for a broaching tool, said broaching tool comprising a holder which defines a longitudinal axis and has a shank, extending in the longitudinal direction, as support for the cutting body, a clamping device for fixing the cutting body in a seat of the shank, wherein the seat has a passage which is at a distance from the free end of the shank and extends transversely to the longitudinal axis and the inside of which forms guide surfaces for bearing surfaces of the cutting body, which can be inserted into the passage in an insertion direction, wherein an end-position limit for the inserted cutting body is formed on guide surfaces and on associated bearing surfaces, and wherein the clamping device produces a force component on the cutting body which presses the latter against the end-position limit, wherein the cutting body comprises a plate-like parent member which has at least one extension forming a cutting edge and has a sloping surface on a narrow side, which sloping surface, for the end-position limit, can be brought to bear against a sloping surface formed in the seat of the tool holder.

11. The cutting body as claimed in claim 9, wherein two diametrically arranged extensions having a respective cutting edge are provided on the parent member.

12. The cutting body as claimed in claim 9, wherein the cutting body is made of a carbide material.

13. The cutting body as claimed in claim 9, further comprising a hole in the parent member, said hole running perpendicularly to the wide sides, defining parallel planes, of said parent member.

14. The cutting body as claimed in claim 10, wherein two diametrically arranged extensions having a respective cutting edge are provided on the parent member.

15. The cutting body as claimed in claim 10, wherein the cutting body is made of a carbide material.

16. The cutting body as claimed in claim 10, further comprising a hole in the parent member, said hole running perpendicularly to the wide sides, defining parallel planes, of said parent member.

17. A broaching tool comprising:
a cutting body;
a holder which defines a longitudinal axis and has a shank, extending in the longitudinal direction, as support for the cutting body;
a clamping device for fixing the cutting body in a seat of the shank;
wherein the seat has a passage which is at a distance from the free end of the shank and extends transversely to the longitudinal axis and the inside of which forms guide surfaces for bearing surfaces of the cutting body, which can be inserted into the passage in an insertion direction,
wherein an end-position limit for the inserted cutting body is formed on guide surfaces and on associated bearing surfaces, and
wherein the clamping device produces a force component on the cutting body which presses the latter against the end-position limit, wherein the cutting body has a parent member in the form of a plate which is to be accommodated in the passage of the shank and whose wide sides opposite one another form bearing surfaces for the guide surfaces of the passage wherein the clamping device has a clamping screw which passes through a hole in the parent member of the cutting body, said hole running perpendicularly to the wide sides, defining parallel planes, of said parent member, and in that, for the clamping screw, a tapped hole is provided on the shank in one of the guide surfaces of the passage.

* * * * *